(12) United States Patent
Wang et al.

(10) Patent No.: US 12,025,821 B2
(45) Date of Patent: Jul. 2, 2024

(54) FILTER UNIT, COLOR FILM STRUCTURE, DISPLAY PANEL, AND DISPLAY DEVICE

(71) Applicant: BOE TECHNOLOGY GROUP CO., LTD., Beijing (CN)

(72) Inventors: Bo Wang, Beijing (CN); Xiangdong Qin, Beijing (CN); Zhao Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 214 days.

(21) Appl. No.: 17/352,467

(22) Filed: Jun. 21, 2021

(65) Prior Publication Data

US 2022/0011482 A1    Jan. 13, 2022

(30) Foreign Application Priority Data

Jul. 9, 2020 (CN) .......................... 202010658189.9

(51) Int. Cl.
*G02B 5/20* (2006.01)

(52) U.S. Cl.
CPC .................................. *G02B 5/201* (2013.01)

(58) Field of Classification Search
CPC ......... G02F 1/133514; G02F 1/136222; G02F 1/133512; G02F 1/133509; H01L 29/78633; H01L 51/5284
See application file for complete search history.

(56) References Cited

U.S. PATENT DOCUMENTS

| | | | | |
|---|---|---|---|---|
| 2005/0110923 A1* | 5/2005 | Yamashita | ............ | G02B 5/223 349/114 |
| 2007/0040974 A1* | 2/2007 | Ninomiya | ......... | G02F 1/133707 349/129 |
| 2008/0080177 A1 | 4/2008 | Zhang | | |
| 2013/0141678 A1* | 6/2013 | Chin | ................ | G02F 1/133345 445/24 |
| 2013/0242228 A1* | 9/2013 | Park | .................. | G02F 1/133617 257/E33.012 |
| 2015/0192834 A1* | 7/2015 | Morinaga | ......... | G02F 1/136213 349/39 |

(Continued)

FOREIGN PATENT DOCUMENTS

| | | |
|---|---|---|
| CN | 1721922 A | 1/2006 |
| CN | 101153992 A | 4/2008 |

(Continued)

OTHER PUBLICATIONS

Lin, English translation of CN-209118017-U (Year: 2019).*

(Continued)

*Primary Examiner* — Jonathan Y Jung
(74) *Attorney, Agent, or Firm* — Lippes Mathias LLP (57) ABSTRACT

Disclosed are a filter unit, a color film structure, a display panel, and a display device. The filter unit includes a color resist aperture. The color resist aperture is configured to accommodate a color resist. At least part of edges of an opening of the color resist aperture have equal distances to a geometric center of the opening. The structure of the color resist aperture of the filter unit is improved, such that at least part of edges of an opening of the color resist aperture have equal distances to the geometric center of the opening.

8 Claims, 5 Drawing Sheets

(56) References Cited

U.S. PATENT DOCUMENTS

| | | | |
|---|---|---|---|
| 2015/0362644 A1* | 12/2015 | Tian | G02B 5/0808 |
| | | | 359/891 |
| 2016/0203778 A1* | 7/2016 | Matsui | G09G 3/3607 |
| | | | 345/690 |
| 2018/0088260 A1 | 3/2018 | Jin et al. | |
| 2018/0357797 A1 | 12/2018 | Thompson | |
| 2021/0165271 A1* | 6/2021 | Li | G02B 5/201 |

FOREIGN PATENT DOCUMENTS

| | | | |
|---|---|---|---|
| CN | 102736314 A | | 10/2012 |
| CN | 104076549 A | | 10/2014 |
| CN | 205355055 U | | 6/2016 |
| CN | 209118017 U | * | 7/2019 |

OTHER PUBLICATIONS

China National Intellectual Property Administration, First office action of Chinese application No. 202010658189.9 dated Mar. 21, 2022, which is foreign counterpart application of this US application.

* cited by examiner

FILTER UNIT, COLOR FILM STRUCTURE, DISPLAY PANEL, AND DISPLAY DEVICE

This application claims priority to Chinese Patent Application No. 202010658189.9, filed on Jul. 9, 2020 and entitled "FILTER UNIT, COLOR FILM STRUCTURE, DISPLAY PANEL, AND DISPLAY DEVICE," the disclosure of which is incorporated herein by reference in its entirety.

TECHNICAL FIELD

The present disclosure relates to the field of display technologies, and in particular, relates to a filter unit, a color film structure, a display panel, and a display device.

BACKGROUND

Responsive to increasingly higher visual requirements from consumers, display products are developing towards high resolution. At present, the resolution of the display products is generally increased by reducing sizes of pixel units.

SUMMARY

Embodiments of the present disclosure provide a filter unit, a color film structure, a display panel, and a display device.

In one aspect, a filter unit is provided. The filter unit includes a color resist aperture. The color resist aperture is configured to accommodate a color resist. At least part of edges of an opening of the color resist aperture have equal distances to a geometric center of the opening.

In some embodiments, the opening of the color resist aperture is in a shape of a regular polygon.

In some embodiments, at least part of vertex angles of the regular polygon are rounded angles.

In some embodiments, at least part of sidelines of the regular polygon are curves.

In some embodiments, the opening of the color resist aperture is in a shape of a circle.

In some embodiments, a pore size of the color resist aperture gradually increases along a direction towards a light exit side of the color resist aperture.

In some embodiments, a wall of the color resist aperture is connected with a plane of the opening by a curved surface.

In some embodiments, a manufacturing material of the filter unit includes a black matrix material.

In some embodiments, the opening of the color resist aperture is in a shape of a circle, and the manufacturing material of the filter unit includes a black matrix material.

In another aspect, a color film structure is provided. The color film structure includes a filter unit group and color resists of a plurality of colors. The filter unit group includes a plurality of filter units arranged in an array. Each of the filter units includes a color resist aperture. At least part of edges of an opening of the color resist aperture have equal distances to a geometric center of the opening.

The color resist of one color is accommodated in the color resist aperture of each of the filter units in the filter unit group.

In some embodiments, the color resists of the plurality of colors include a first color resist, a second color resist, and a third color resist, and the filter unit group includes a first filter unit, a second filter unit, and a third filter unit; wherein the first color resist is accommodated in the color resist aperture of the first filter unit, the second color resist is accommodated in the color resist aperture of the second filter unit, and the third color resist is accommodated in and the color resist aperture of the third filter unit.

A size of the opening of the color resist aperture of the first filter unit is less than a size of the opening of the color resist aperture of the second filter unit, and is less than a size of the opening of the color resist aperture of the third filter unit.

In some embodiments, the size of the opening of the color resist aperture of the second filter unit is less than the size of the opening of the color resist aperture of the third filter unit.

In some embodiments, a ratio of the size of the opening of the color resist aperture of the first filter unit to the size of the opening of the color resist aperture of the second filter unit to the size of the opening of the color resist aperture of the third filter unit is 43:55:63.

In some embodiments, the size of the opening of the color resist aperture of the first filter unit is not less than 365.5 µm and not greater than 494.5 µm, the size of the opening of the color resist aperture of the second filter unit is not less than 467.5 µm and not greater than 632.5 µm, and the size of the opening of the color resist aperture of the third filter unit is not less than 535.5 µm not greater than 724.5 µm.

In some embodiments, the first color resist is a green color resist, the second color resist is a red color resist, and the third color resist is a blue color resist.

In some embodiments, the color film structure further includes a black matrix disposed between two adjacent filter units.

In some embodiments, the third filter unit is disposed between the first filter unit and the second filter unit.

In some embodiments, the third filter unit is adjacent to at least two of the first filter units, and the third filter unit is adjacent to at least one of the second filter unit.

In another aspect, a display panel is provided. The display panel includes a backlight assembly and a color film structure. A side of the backlight assembly is attached to a side of the color film structure.

The color film structure includes a filter unit group and color resists of a plurality of colors, wherein the filter unit group includes a plurality of filter units arranged in an array. Each of the filter units includes a color resist aperture, and at least part of edges of an opening of the color resist aperture have equal distances to a geometric center of the opening, wherein a color resist of one color is accommodated in the color resist aperture of each of the filter units in the filter unit group.

In still another aspect, a display device is provided. The display device includes a power supply assembly and the display panel according to the foregoing aspect. The power supply assembly is configured to supply power to a backlight assembly in the display panel.

DETAILED DESCRIPTION

The present disclosure is described below in detail. Examples of the embodiments of the present disclosure are shown in the accompanying drawings. The same or similar reference numerals indicate the same or similar parts or parts having the same or similar functions throughout the present disclosure. In addition, if the detailed description of the prior art is not necessary for the features of the shown present disclosure, the detailed description is omitted. The following embodiments by reference to the accompanying drawings are exemplary, and are only used to explain the present disclosure but cannot be explained as a limitation to the present disclosure.

It may be understood by a person skilled in the art that unless otherwise defined, all terms (including technical terms and scientific terms) used herein have the same meanings as those generally understood by a person of ordinary skill in the art of the present disclosure. It should be further understood that terms such as those defined in general dictionaries should be understood to have the same meanings as those in the context of the prior art, and unless similarly particularly defined herein, ideal or formal meanings are not used.

It may be understood by a person skilled in the art that unless otherwise stated, the singular forms "a," "an," and "the" used herein are intended to include the plural forms as well. It should be further understood that the term "include" used in the description of the present disclosure refers to the presence of a feature and/or a component, but does not exclude the presence or addition of one or more other features, components, and/or combinations thereof. The term "and/or" used herein includes all or any and all combinations of one or more of the associated listed items.

Several nouns in the present disclosure are first described and explained:

A color resist is a light-transmitting medium that allows the passage of light with a specified wavelength (that is, a specified color) and blocks the passage of light with other wavelengths (that is, other colors). For example, a color resist that allows the passage of green light is a green color resist. A color resist that allows the passage of red light is a red color resist. A color resist that allows the passage of blue light is a blue color resist.

At present, the resolution of display products is generally increased by reducing the sizes of pixel units. However, due to the small size of the pixel unit, light passing through the pixel unit or light emitted by the pixel unit may be diffracted, which causes the phenomenon of color separation and reduce display quality.

Figure 1:
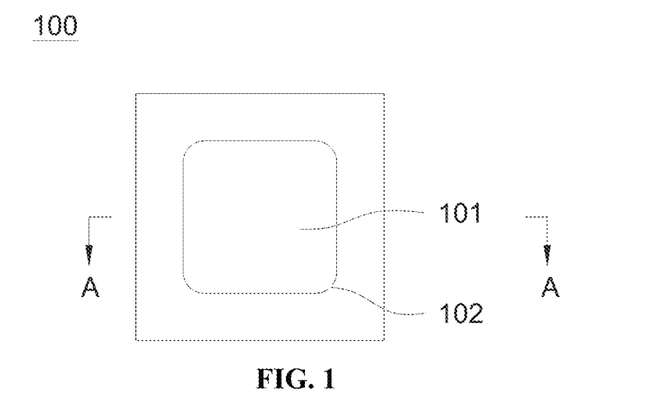
FIG. 1 is a schematic structural diagram of a filter unit according to an embodiment of the present disclosure.

FIG. 1 is a schematic structural diagram of a filter unit according to an embodiment of the present disclosure. As shown in FIG. 1, a filter unit 100 includes a color resist aperture 101. At least part of edges of an opening of the color resist aperture 101 have equal distances to a geometric center of the opening. The color resist aperture 101 is configured to accommodate a color resist.

In the embodiment of the present disclosure, the color resist aperture 101 of the filter unit 100 is structured such that at least part of edges of an opening have equal distances to a geometric center of the opening, such that the distances between the edges of the opening of the color resist aperture 101 and the geometric center of the opening are less different. In this way, the probability of diffraction or the degree of diffraction of light passing through a single color resist aperture 101 can be reduced, which helps to reduce the degree of color separation, thereby improving display quality.

Figure 2:
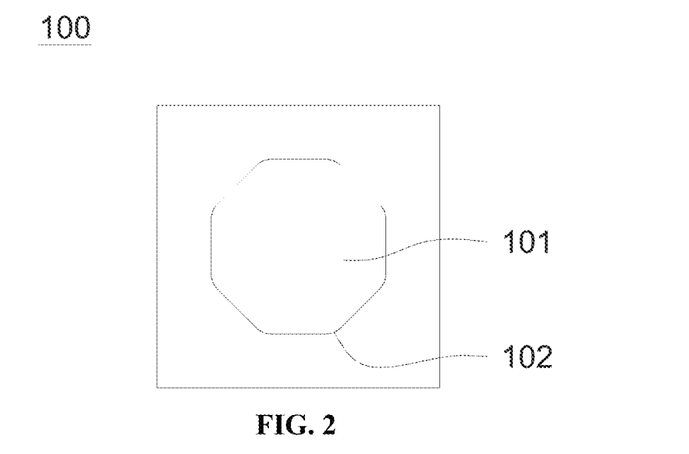
FIG. 2 is a schematic structural diagram of another filter unit according to an embodiment of the present disclosure.

In some embodiments, the opening of the color resist aperture 101 is in a shape of a regular polygon. The regular polygon may include a square, a regular pentagon, a regular hexagon, a regular heptagon, a regular octagon, or the like. For example, referring to FIG. 1, the opening of the color resist aperture 101 is square. In another example, FIG. 2 is a schematic structural diagram of another filter unit according to an embodiment of the present disclosure. As shown in FIG. 2, the opening of the color resist aperture 101 is in a shape of a regular hexagon.

In some embodiments, the shape of the opening of the color resist aperture 101 is arranged as a regular polygon, such that the distances between the edges of the opening of the color resist aperture 101 and the geometric center of the opening change slightly. That is, the distances between the edges of the opening of the color resist aperture 101 and the geometric center of the opening are as equal as possible. The probability of diffraction or the degree of diffraction of light passing through the color resist aperture 101 can be reduced.

In some embodiments, the opening of the color resist aperture 101 is in the shape of a regular polygon. At least part of vertex angles of the regular polygon are rounded angles. For example, referring to FIG. 1 or FIG. 2, all vertex angles of the regular polygon are rounded angles 102.

In the embodiment of the present disclosure, setting at least part of vertex angles of the opening of the regular polygon rounded angles allows a smoother variation of the distances between the edges at the vertex angles of the opening of the color resist aperture 101 and the geometric center of the opening, which helps to reduce variation of the distances between the edges of the opening of the color resist aperture 101 and the geometric center of the opening. The probability of diffraction or the degree of diffraction of light passing through a single color resist aperture 101 is reduced, thereby reducing the degree of color separation.

Figure 3:
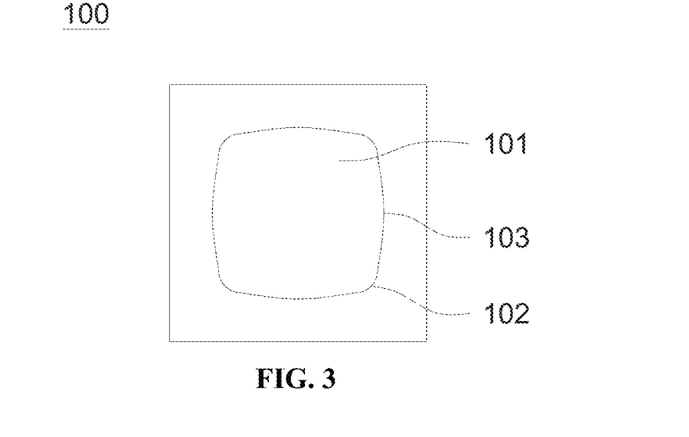
FIG. 3 is a schematic structural diagram of still another filter unit according to an embodiment of the present disclosure.

In some embodiments, the opening of the color resist aperture 101 is in a shape of a regular polygon. At least part of sidelines of the regular polygon are curves. In some embodiments, a projection of the center of the curve onto a plane of the opening falls within the opening. For example, the projection of the center of the curve onto the plane of the opening coincides with the geometric center of the opening. In some embodiments, FIG. 3 is a schematic structural diagram of still another filter unit according to an embodiment of the present disclosure. As shown in FIG. 3, all sidelines of the regular polygon are curves 103.

In the embodiment of the present disclosure, the sidelines of the opening of the regular polygon of the color resist aperture 101 are improved. Specifically, in a plane perpendicular to an axis of the color resist aperture 101, the sidelines of the opening of the regular polygon of the color resist aperture 101 are curves, such that the distances between the parts of the curved sidelines of the regular polygon and the geometric center of the opening are less different, which helps to reduce the probability of diffraction or the degree of diffraction of light passing through a single color resist aperture 101, thereby reducing the degree of color separation.

Figure 4:
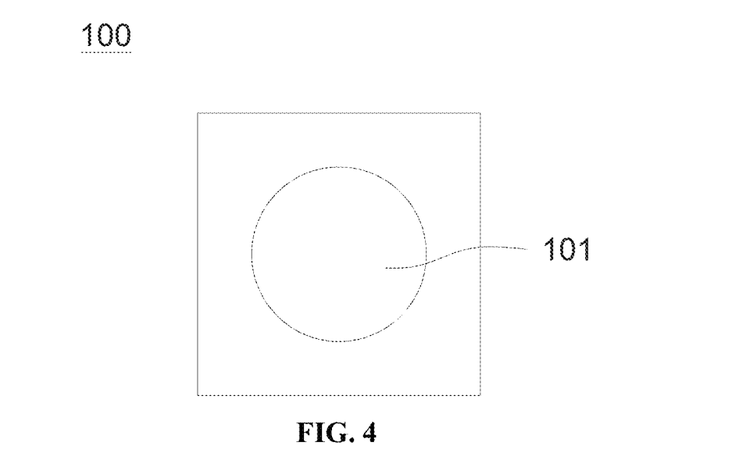
FIG. 4 is a schematic structural diagram of still another filter unit according to an embodiment of the present disclosure.

In some other embodiments, the opening of the color resist aperture 101 is in a shape of a circle. For example, FIG. 4 is a schematic structural diagram of still another filter unit according to an embodiment of the present disclosure.

In an embodiment, a circular opening structure is employed such that the distances between all the edges of the opening of the color resist aperture 101 and the geometric center of the opening are equal. In this way, the manufacturing efficiency of color resist apertures can be improved, and the probability of diffraction or the degree of diffraction of light passing through a single color resist aperture 101 can be better reduced, which helps to reduce the degree of color separation, thereby improving display quality.

Figure 5:
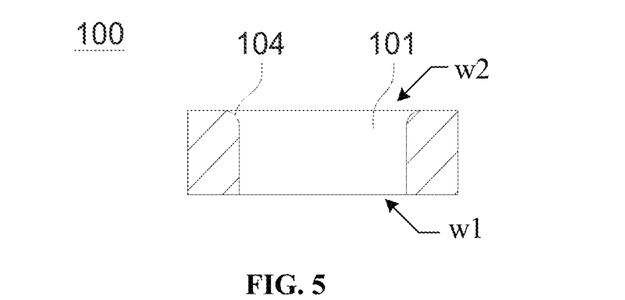
FIG. 5 is a schematic cross-sectional view of the filter unit shown in FIG. 1 in an AA' direction.

In some embodiments, FIG. 5 is a schematic cross-sectional view of the filter unit shown in FIG. 1 in an AA' direction. As shown in FIG. 5, the color resist aperture 101 includes a light incident side w1 and a light exit side w2. During working of the filter unit, light emitted from a backlight assembly is emitted into the color resist aperture through the light incident side w1. After passing through a color resist, the light is emitted out through the light exit side w2 of the color resist aperture. A pore size of the color resist aperture 101 gradually increases in a direction towards a light exit side of the color resist aperture 101.

In this embodiment of the present disclosure, the size of the opening of the color resist aperture 101 is increased, such that the probability of diffraction or the degree of diffraction of light passing through a single color resist aperture 101 is reduced, which helps to reduce the degree of color separation, thereby improving display quality.

In some embodiments, with further reference to FIG. 5, a curved surface is provided at a connection between a wall of the color resist aperture 101 and a plane in which the opening of the color resist aperture 101 is located. That is, an intersecting line 104 between an edge region of the wall of the color resist aperture 101 and an axial section of the color resist aperture 101 is a curve.

In the embodiment of the present disclosure, the edges of the opening of the color resist aperture 101 are rounded, specifically in a direction parallel to the axis of the color resist aperture 101, at least at the opening of the color resist aperture 101. For example, a flared structure may be employed at the opening of the color resist aperture 101 to increase the size of the opening of the color resist aperture 101, which helps to reduce the probability of diffraction or the degree of diffraction of light passing through a single color resist aperture 101, to reduce the degree of color separation, thereby improving display quality.

Figure 6:
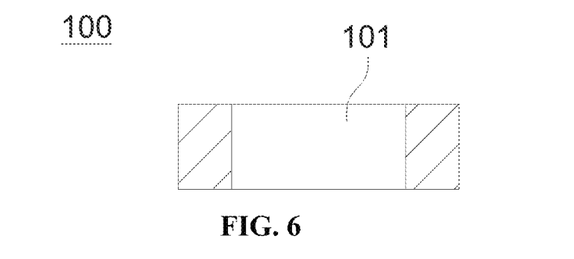
FIG. 6 is another schematic cross-sectional view of the filter unit shown in FIG. 1 in an AA' direction.

In some embodiments, FIG. 6 is another schematic cross-sectional view of the filter unit shown in FIG. 1 in an AA' direction. As shown in FIG. 6, the pore size of the color resist aperture 101 remains equal in the direction of the axis of the color resist aperture 101.

In some embodiments, a manufacturing material of the filter unit 100 includes a black matrix material.

Figure 7:
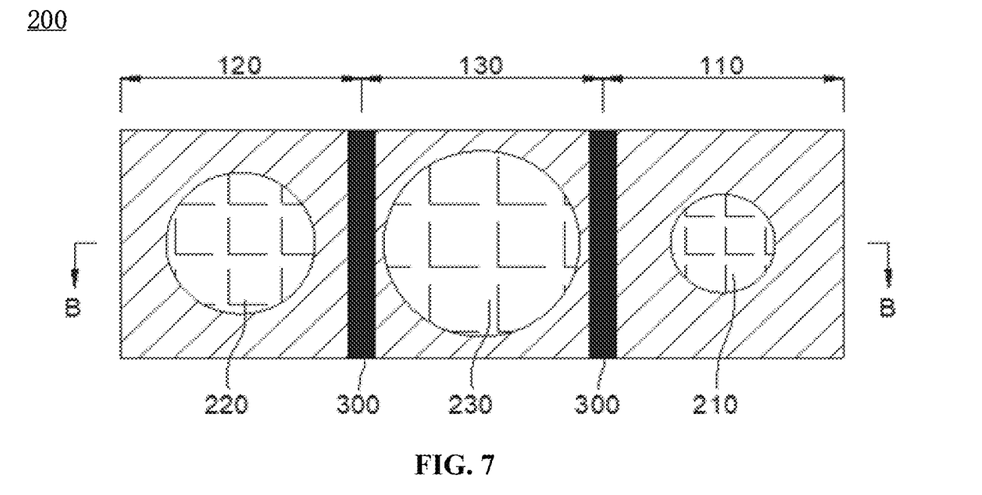
FIG. 7 is a schematic structural diagram of a color film structure according to an embodiment of the present disclosure.
Figure 8:
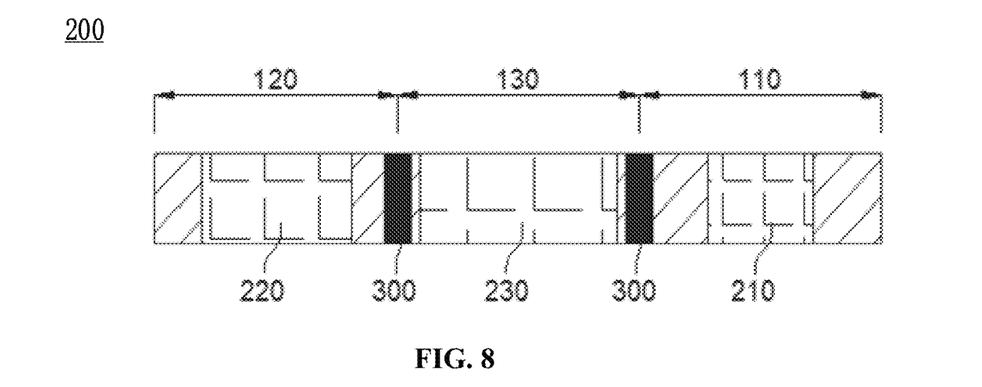
FIG. 8 is a schematic cross-sectional view of the color film structure shown in FIG. 7 in a BB' direction.

Based on the same inventive concept, an embodiment of the present disclosure provides a color film structure. FIG. 7 is a schematic structural diagram of a color film structure according to an embodiment of the present disclosure. FIG. 8 is a schematic cross-sectional view of the color film structure shown in FIG. 7 in a BB' direction. As shown in FIG. 7 and FIG. 8, a color film structure 200 includes a filter unit group and color resists of a plurality of colors. The filter unit group includes a plurality of filter units arranged in an array. The filter unit includes a color resist aperture. At least part of edges of an opening of the color resist aperture have an equal distance to a geometric center of the opening. The color resist of one color is accommodated in the color resist aperture of each of the filter units in the filter unit group. The filter unit in the color film structure 200 may be the filter unit 100 as shown in any one of FIG. 1 to FIG. 6.

In some embodiments, referring to FIG. 7 and FIG. 8, the color resists of the plurality of colors include a first color resist 210, a second color resist 220, and a third color resist 230. The filter unit group includes a first filter unit 110, a second filter unit 120, and a third filter unit 130. The first color resist 210 is accommodated in the color resist aperture of the first filter unit 110. The second color resist 220 is accommodated in the color resist aperture of the second filter unit 120. The third color resist 230 is accommodated in the color resist aperture of the third filter unit 130.

The size of the opening of the color resist aperture of the first filter unit 110 is less than the size of the opening of the color resist aperture of the second filter unit 120. The size of the opening of the color resist aperture of the first filter unit 110 is less than the size of the opening of the color resist aperture of the third filter unit 130. In the embodiment of the present disclosure, the size of the opening of the color resist aperture is the largest distance between the edges of the opening of the color resist aperture. For example, the opening of the color resist aperture is a circular opening. The size of the opening of the color resist aperture is the diameter of the opening of the color resist aperture. In another example, the opening of the color resist aperture is a regular polygonal opening. The size of the opening of the color resist aperture is a diagonal of the opening of the color resist aperture.

In the embodiment of the present disclosure, the color film structure 200 employs a structure including a plurality of the filter units, which respectively accommodate color resists of different colors. The size of the opening of the color resist aperture of the filter unit designed to accommodate a color resist of one color is less than the sizes of the openings of the color resist apertures of the filter unit designed to accommodate the color resists of the other two colors, which can effectively reduce the degree of color separation and help to improve display quality.

It may be understood that light filtered through the color resist in the filter unit gives pixels of specified colors. Therefore, the size of the opening of the color resist aperture of the filter unit may limit the size of a pixel of a corresponding color.

In some embodiments, the first color resist 210 is a green color resist, and is accommodated by the first filter unit 110. The second color resist 220 is one of a red color resist and a blue color resist, and is accommodated by the second filter unit 120. The third color resist 230 is the other one of the red color resist and the blue color resist, and is accommodated by the third filter unit 130. The size of the opening of the color resist aperture of the first filter unit 110 is less than the sizes of the openings of the color resist apertures of the second filter unit 120 and the third filter unit 130. In this way, the size of a green pixel may be less than the size of a red pixel, and the size of the green pixel may also be less than the size of a blue pixel, which can effectively reduce the degree of color separation and help to improve display quality.

In some embodiments, continuing to refer to FIG. 7 and FIG. 8, the size of the opening of the color resist aperture of the second filter unit 120 is less than the size of the opening of the color resist aperture of the third filter unit 130. Correspondingly, the first color resist 210 in the first filter unit 110 is a green color resist, the second color resist 220 in the second filter unit 120 is a red color resist, and the third color resist 230 in the third filter unit 130 is a blue color resist.

Based on the above embodiments, an embodiment of the present disclosure further defines a size relationship between the size of the opening of the color resist aperture of the second filter unit 120 and the size of the opening of the color resist aperture of the third filter unit 130, such that when the first color resist 210 is a green color resist, the second color resist 220 is a red color resist, and the third color resist 230 is a blue color resist, the size of the green pixel is the smallest, and the size of the blue pixel is the largest. In this way, the reduction of the degree of color separation can be intensified, which helps to improve display quality.

In some embodiments, a ratio of the size of the opening of the color resist aperture of the first filter unit 110 to the size of the opening of the color resist aperture 101 of the second filter unit 120 to the size of the opening of the color resist aperture of the third filter unit 130 is 43:55:63.

In some embodiments, the sizes of the openings of the color resist apertures of the first filter unit 110, the second filter unit 120, and the third filter unit 130 are in a ratio of 43:55:63, such that a size ratio of pixels of specified colors presented after light passes through the color film structure is 43:55:63.

For example, specifically, a ratio of the size of the green pixel, the size of the red pixel and the size of the blue pixel may be 43:55:63. In this way, the reduction of the degree of color separation can be intensified. In addition, in combination with adjusting the passing rate of light at blue color resists (i.e., light emission efficiency of blue light), the reduction of the degree of color separation can be further intensified, thereby improving display quality.

In some other embodiments, the size of the opening of the color resist aperture of the first filter unit 110 is not less than 365.5 μm, and not greater than 494.5 μm. The size of the opening of the color resist aperture of the second filter unit 120 is not less than 467.5 μm, and not greater than 632.5 μm. The size of the opening of the color resist aperture of the third filter unit 130 is not less than 535.5 μm, and not greater than 724.5 μm.

In an embodiment, the sizes of the openings of the color resist apertures of the first filter unit 110, the second filter unit 120, and the third filter unit 130 respectively employ specific values within a corresponding range, such that the sizes of pixels of specified colors presented after light passes through the color film structure are specific values within a corresponding range.

For example, specifically, the size of the green pixel may be not less than 365.5 μm, and may be not greater than 494.5 μm. The size of the red pixel may be not less than 467.5 μm, and may be not greater than 632.5 μm. The size of the blue pixel may be not less than 535.5 μm, and may be not greater than 724.5 μm. In this way, the reduction of the degree of color separation can be intensified. Similarly, in combination with the adjusting passing rate of light at blue color resists (i.e., light emission efficiency of blue light), the reduction of the degree of color separation can also be further intensified, thereby improving display quality.

In some embodiments, continuing to refer to FIG. 7 and FIG. 8, the third filter unit 130 is disposed between the first filter unit 110 and the second filter unit 120.

In the embodiment of the present disclosure, the positions of the first filter unit 110, the second filter unit 120, and the third filter unit 130 are specifically defined. That is, the positions of the first color resist 210, the second color resist 220, and the third color resist 230 are specifically defined, such that the reduction of the degree of color separation is intensified, thereby improving display quality.

For example, specifically, the blue color resist may be disposed between the green color resist and the red color resist. That is, the blue pixel is disposed between the green pixel and the red pixel.

Figure 9:
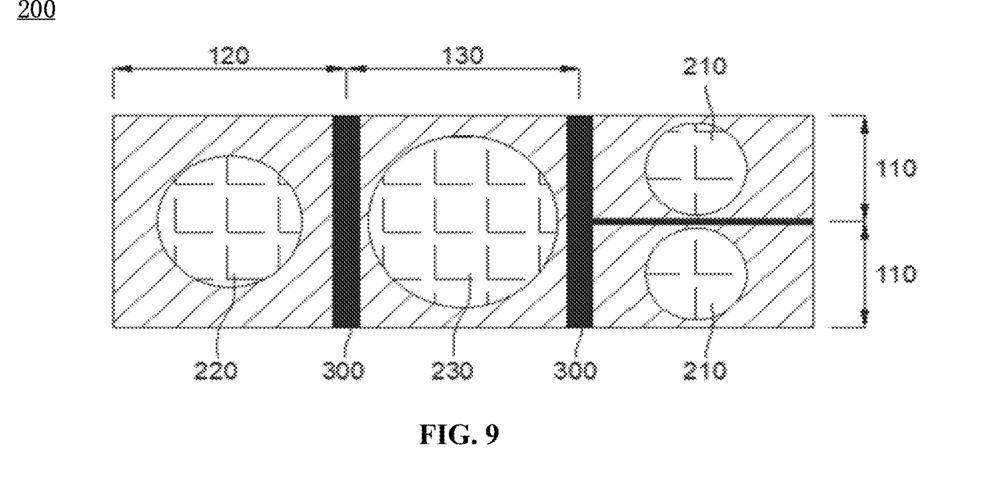
FIG. 9 is a schematic structural diagram of another color film structure according to an embodiment of the present disclosure.

In some embodiments, FIG. 9 is a schematic structural diagram of another color film structure according to an embodiment of the present disclosure. As shown in FIG. 9, the third filter unit 130 is adjacent to at least two first filter units 110, and the third filter unit 130 is adjacent to at least one second filter unit 120.

In the embodiment of the present disclosure, the quantities of filter units in the filter unit group formed by the first filter unit 110, the second filter unit 120, and the third filter unit 130 are specifically limited. That is, the quantities of the first color resists 210, the second color resists 220, and the third color resists 230 are specifically limited, such that the reduction of the degree of color separation is intensified, thereby improving display quality.

For example, specifically, the blue color resist may be adjacent to at least two green color resists, and the blue color resist may be adjacent to at least one red color resist. That is, one blue pixel, two green pixels, and one red pixel form a pixel unit group.

Further, in consideration of that the definition of boundaries between different pixels affects the degree of color separation, the embodiment of the present disclosure further provides other possible implementations of the color film structure 200:

In some embodiments, as shown in FIG. 7 to FIG. 9, the color film structure 200 further includes a black matrix 300 disposed between two adjacent filter units. For example, the black matrix 300 is embedded between the second filter unit 120 and the third filter unit 130. The black matrix 300 is further embedded between the third filter unit 130 and the first filter unit 110.

In the embodiment, because the black matrix 300 may absorb light, when the black matrix 300 is disposed between two adjacent filter units, especially, when the black matrix 300 is disposed between the color resist apertures of two adjacent filter units, boundaries (i.e., boundaries between pixels) between the color resist apertures 101 can be clearly defined. In this way, this helps to reduce color crosstalk as well as the degree of color separation, such that display quality can be improved. In some embodiments, the black matrix 300 is disposed at a position where no pixel is provided, to absorb excessive light in a non-pixel region to eliminate impurity light.

Figure 10:
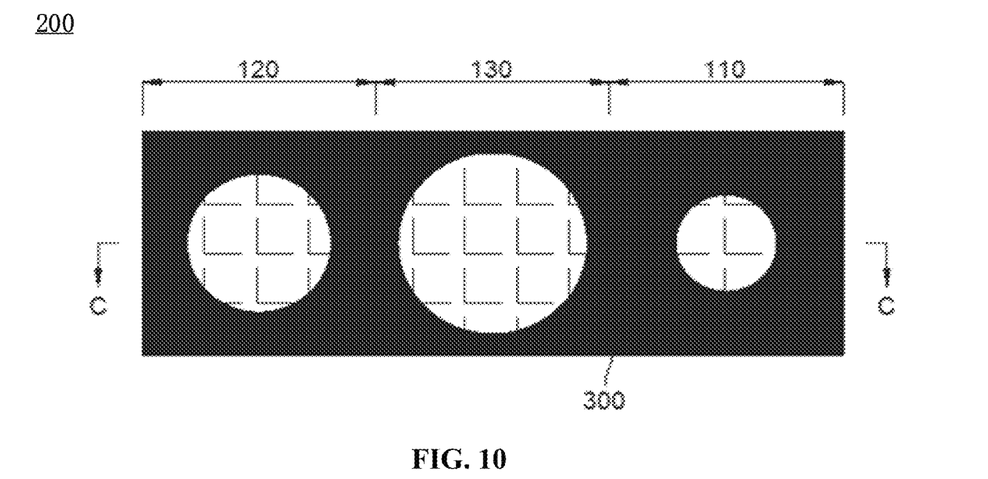
FIG. 10 is a schematic structural diagram of still another color film structure according to an embodiment of the present disclosure.
Figure 11:
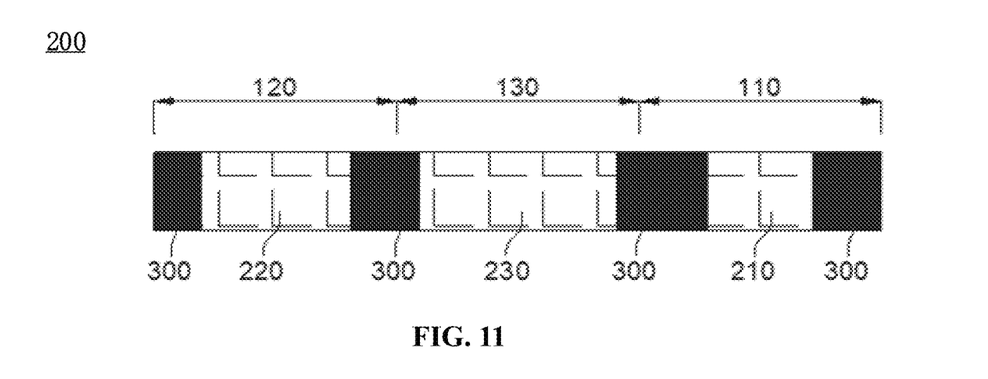
FIG. 11 is a schematic sectional view of the color film structure shown in FIG. 10 in a CC' direction.

In some other embodiments, a manufacturing material of the filter unit includes a black matrix material. FIG. 10 is a schematic structural diagram of still another color film structure according to an embodiment of the present disclosure. FIG. 11 is a schematic cross-sectional view of the color film structure shown in FIG. 10 in a CC' direction. As shown in FIG. 10 and FIG. 11, the filter units 110 to 130 may be mainly formed of the black matrices 300. An aperture (for example, a through aperture or a deep aperture) provided in the black matrix 300 is a color resist aperture, and may be used for accommodating a color resist of a corresponding color.

In the embodiment, the color film structure 200 includes a black matrix 300 and color resists of a plurality of colors. Apertures (for example, through apertures or deep apertures) distributed in an array in the black matrix 300 are color resist apertures, and are used for accommodating color resists of corresponding colors.

Based on the same inventive concept, embodiments of the present disclosure provide a display panel. The display panel includes a backlight assembly (not shown in the figure) and a color film structure. A side of the backlight assembly is attached to a side of the color film structure.

The color film structure includes a filter unit group and color resists of a plurality of colors. The filter unit group includes a plurality of filter units arranged in an array. The filter units include color resist apertures. At least part of edges of an opening of the color resist aperture have equal distances to a geometric center of the opening. A color resist of one color is accommodated in the color resist aperture of each of the filter units in the filter unit group. In some embodiments, the filter unit is a filter unit 100 as shown in any one of FIG. 1 to FIG. 6. The color film structure is a color film structure 200 as shown in any one of FIG. 7 to FIG. 11.

In the embodiment of the present disclosure, the backlight assembly provides a backlight to the display panel. The backlight is filtered by the color film structure 200 provided in the foregoing embodiments to form various required pixels and ultimately the picture.

In some embodiments, the backlight assembly may include a base layer, a cathode layer, an electron transport layer, a light-emitting layer, a hole transport layer, an anode layer, and the like, to form a backlight structure such as a light-emitting diode (LED), a micro-LED, an organic light-emitting diode (OLED), or the like.

In some other embodiments, the backlight assembly may include a backlight layer, an array substrate, a liquid crystal encapsulation layer, or the like, to form a liquid crystal display (LCD) backlight structure.

In the embodiment of the present disclosure, because the display panel employs any color film structure 200 provided in the foregoing embodiments, for details about the principles and technical effects of the color film structure 200, reference may be made to the above embodiments, which are not repeated herein.

Based on the same inventive concept, an embodiment of the present disclosure provides a display device. The display device includes a power supply assembly and the filter unit 100 shown in any one of FIG. 1 to FIG. 6. Alternatively, the display device includes a power supply assembly and the color film structure 200 shown in any one of FIG. 7 to FIG. 11. Alternatively, the display device includes a power supply assembly and any display panel provided in the foregoing embodiments. The power supply assembly is configured to supply power, for example, configured to supply power to the backlight assembly in the display panel. In some embodiments, the power supply assembly is a power source.

Figure 12:
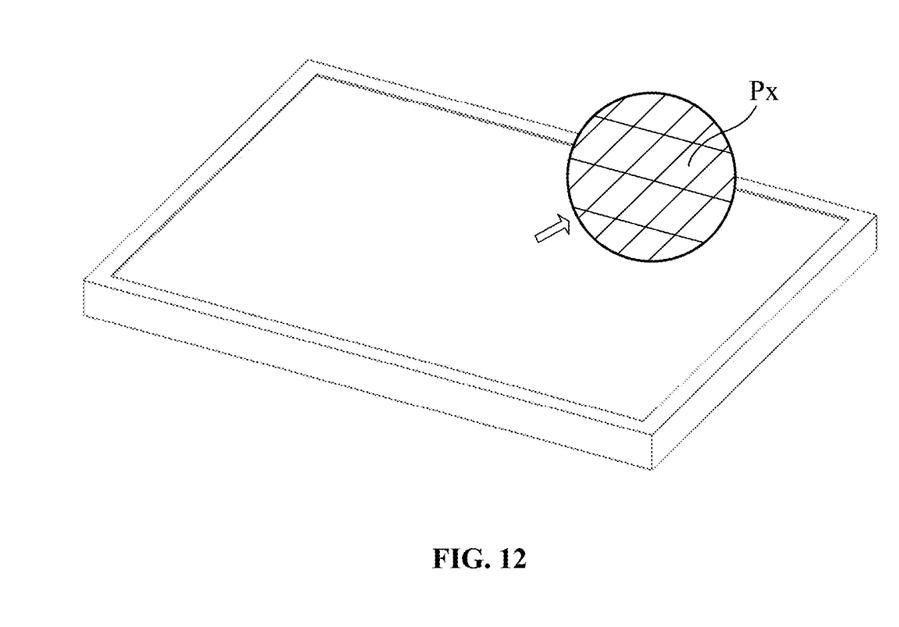
FIG. 12 is a schematic structural diagram of a display device according to an embodiment of the present disclosure.

The display device in the embodiments of the present disclosure may be a mobile phone, a tablet computer, a television, a display, a notebook computer, a digital frame, a navigator and any other product or component having a display function. In an example, FIG. 12 is a schematic structural diagram of a display device according to an embodiment of the present disclosure. The display panel of the display device includes sub-pixels Px arranged in rows and columns within the display region. Each sub-pixel Px may correspond to one of the foregoing color resist or color resist apertures.

In the embodiment of the present disclosure, because the display device employs any filter unit 100 provided in the foregoing embodiments, or any color film structure 200 provided in the foregoing embodiments, or any display panel provided in the above embodiments, for details about the principles and technical effects of the filter unit 100, the color film structure 200, and the display panel, reference may be made to the above embodiments, which are not repeated herein.

The application of the embodiments of the present disclosure can at least achieve the following beneficial effects:

1. The color resist aperture 101 of the filter unit 100 employs a structure that at least part of edges of an opening have equal distances to a geometric center of the opening, such that the distances between the edges of the opening of the color resist aperture 101 and the geometric center of the opening are less different. In this way, the probability of diffraction or the degree of diffraction of light passing through a single color resist aperture 101 can be reduced, which helps to reduce the degree of color separation, thereby improving display quality.

2. The shape of the opening of the color resist aperture 101 is in a shape of a regular polygon, such that the distances between the edges of the opening of the color resist aperture 101 and the geometric center of the opening change slightly. That is, the distances between the edges of the opening of the color resist aperture 101 and the geometric center of the opening are as equal as possible. In addition, at least part of vertex angles of the opening of the regular polygon are set to rounded angles. The distances between the edges at the vertex angles of the opening of the color resist aperture 101 and the geometric center of the opening vary smoother, which helps to reduce variation of the distances between the edges of the opening of the color resist aperture 101 and the geometric center of the opening. The probability of diffraction or the degree of diffraction of light passing through a single color resist aperture 101 is reduced, thereby reducing the degree of color separation.

3. The sidelines of the opening of the regular polygon of the color resist aperture 101 are improved. Specifically, in a plane perpendicular to an axis of the color resist aperture 101, the sidelines of the opening of the regular polygon of the color resist aperture 101 are curves, such that the distances between the parts on the curved sidelines of the regular polygon and the geometric center of the opening are less different, which helps to reduce the probability of diffraction or the degree of diffraction of light passing through a single color resist aperture 101, thereby reducing the degree of color separation.

4. When a circular opening structure is employed, such that the distances between all the edges of the opening of the color resist aperture 101 and the geometric center of the opening are equal. In this way, the manufacturing efficiency of color resist apertures can be improved, and the probability of diffraction or the degree of diffraction of light passing through a single color resist aperture 101 can be better reduced, which helps to reduce the degree of color separation, thereby improving display quality.

5. An edge of the opening of the color resist aperture 101 is rounded, specifically, in a direction parallel to the axis of the color resist aperture 101, at least at the opening of the color resist aperture 101. For example, a flared structure may be employed at the opening of the color resist aperture 101, to increase the size of the opening of the color resist aperture 101, which helps to reduce the probability of diffraction or the degree of diffraction of light passing through a single color resist aperture 101, to reduce the degree of color separation, thereby improving display quality.

6. The color film structure 200 is a structure including a plurality of the filter units, which respectively accommodate color resists of different colors. The size of the opening of the color resist aperture of the filter unit designed to accommodate a color resist of one color is less than the sizes of the openings of the color resist apertures of the filter unit that are designed to accommodate color resists of the other two colors, which can effectively reduce the degree of color separation and help to improve display quality.

7. A size relationship between the size of the opening of the color resist aperture of the second filter unit 120 and the size of the opening of the color resist aperture of the third filter unit 130 is further defined, such that when the first color resist 210 is a green color resist, the second color resist 220 is a red color resist, and the third color resist 230 is a blue color resist, the size of a green pixel is the smallest, and the size of a blue pixel is the largest. In this way, the reduction of the degree of color separation can be intensified, which helps to improve display quality.

8. The third filter unit 130 is disposed between the first filter unit 110 and the second filter unit 120. That is, the positions of the first color resist 210, the second color resist 220, and the third color resist 230 are specifically limited, such that the reduction of the degree of color separation is intensified, thereby improving display quality.

9. The third filter unit 130 is adjacent to at least two first filter units 110, and the third filter unit 130 is adjacent to at least one second filter unit 120. That is, the quantities of the first color resists 210, the second color resists 220, and the third color resists 230 are specifically limited, such that the reduction of the degree of color separation is intensified, thereby improving display quality.

10. Because the black matrix 300 may absorb light, when the black matrix 300 is disposed between two adjacent filter units, especially between color resist apertures of two adjacent filter units, boundaries (i.e., boundaries between pixels) between the color resist apertures 101 can be clearly defined. In this way, this helps to reduce color crosstalk as well as the degree of color separation, such that display quality can be improved.

It may be understood by a person skilled in the art that the operations, methods, steps in the flows, measures, and solutions already discussed in the present disclosure may be alternated, changed, combined or deleted. Further, other operations, methods, steps in the flows, measures, and solutions already discussed in the present disclosure may also be alternated, changed, rearranged, decomposed, combined or deleted. Further, operations, methods, steps in flows, measures, and solutions in the prior art that are the same as those already discussed in the present disclosure may also be alternated, changed, rearranged, decomposed, combined or deleted.

In the description of the present disclosure, it needs to be understood that orientation or location relationships indicated by terms "center," "up," "down," "front," "rear," "left," "right," "vertical," "horizontal," "top," "bottom," "inside," and "outside" are based on orientation or location relationships shown in the accompanying drawings, and are intended only to facilitate description of the present disclosure and simplify description, but are not to indicate or imply that the devices or elements must have specific orientations or are constructed and operated in specific orientations, and therefore, cannot be understood as a limit to the present disclosure.

The terms "first" and "second" are used only for description, but are not to be understood as indicating or implying relative importance or implicitly specify a quantity of indicated technical features. Therefore, features defined by "first" and "second" may explicitly or implicitly include one or more features. In the description of the present disclosure, "a plurality of" herein means "two or more" unless otherwise described.

In the description of the present disclosure, it should be noted that unless otherwise expressly specified and defined, "mounted," "connected," and "connection" should be understood in a broad sense, for example, fixedly connected, detachably connected, or integrally connected, or connected directly or through an intermediate medium, or two elements connected internally. For a person skilled in the art, specific meanings of the above terms in the present disclosure should be understood according to specific conditions.

In the description of this specification, specific features, structures, materials or characteristics may be combined in an appropriate fashion in any one or more embodiments or examples.

Described above are only exemplary embodiments of the present disclosure. It should be noted that for a person of ordinary skill in the art, several improvements and modifications may further be made without departing from the principle of the present disclosure. These improvements and modifications should also be deemed as falling within the scope of protection of the present disclosure.

What is claimed is:

1. A color film structure, comprising a filter unit group and color resists of a plurality of colors, wherein the filter unit group comprises a plurality of filter units arranged in an array, each of the filter units comprising a color resist aperture, at least part of edges of an opening of the color resist aperture having equal distances to a geometric center of the opening;

wherein the color resist of one color is accommodated in the color resist aperture of each of the filter units in the filter unit group;

wherein a pore size of the color resist aperture gradually increases along a direction towards a light exit side of the color resist aperture, and a flared structure is employed at the opening, which is at the light exit side, of the color resist aperture to increase a size of the opening of the color resist aperture; and wherein the opening of the color resist aperture is in a shape of a regular polygon, at least part of vertex angles of the regular polygon are rounded angles, and distances between the at least part of vertex angles of the regular polygon and the geometric center of the opening are equal;

wherein the size of the opening of the color resist aperture of the second filter unit is less than the size of the opening of the color resist aperture of the third filter unit, and wherein a ratio of the size of the opening of the color resist aperture of the first filter unit to the size of the opening of the color resist aperture of the second filter unit to the size of the opening of the color resist aperture of the third filter unit is 43:55:63, or, wherein the size of the opening of the color resist aperture of the first filter unit is not less than 365.5 μm and not greater than 494.5 μm, the size of the opening of the color resist aperture of the second filter unit is not less than 467.5 μm and not greater than 632.5 μm, and the size of the opening of the color resist aperture of the third filter unit is not less than 535.5 μm and not greater than 724.5 μm.

2. The color film structure according to claim 1, wherein the color resists of the plurality of colors comprise a first color resist, a second color resist, and a third color resist, and the filter unit group comprises a first filter unit, a second filter unit, and a third filter unit, wherein the first color resist is accommodated in the color resist aperture of the first filter unit, the second color resist is accommodated in the color resist aperture of the second filter unit, and the third color resist is accommodated in the color resist aperture of the third filter unit; and a size of the opening of the color resist aperture of the first filter unit is less than a size of the opening of the color resist aperture of the second filter unit, and is less than a size of the opening of the color resist aperture of the third filter unit.

3. The color film structure according to claim 2, wherein the third filter unit is disposed between the first filter unit and the second filter unit.

4. The color film structure according to claim 3, wherein the third filter unit is adjacent to at least two of the first filter units, and the third filter unit is adjacent to at least one of the second filter units.

5. The color film structure according to claim 1, wherein the first color resist is a green color resist, the second color resist is a red color resist, and the third color resist is a blue color resist.

6. The color film structure according to claim 1, further comprising: a black matrix disposed between two adjacent filter units.

7. A display panel, comprising a backlight assembly and a color film structure; wherein a side of the backlight assembly is attached to a side of the color film structure; and the color film structure comprises a filter unit group and color resists of a plurality of colors, wherein the filter unit group comprises a plurality of filter units arranged in an array, each of the filter units comprising a color resist aperture, and at least part of edges of an opening of the color resist aperture having equal distances to a geometric center of the opening, wherein a color resist of one color is accommodated in the color resist aperture of each of the filter units in the filter unit group;

wherein a pore size of the color resist aperture gradually increases along a direction towards a light exit side of the color resist aperture, and a flared structure is employed at the opening, which is at the light exit side, of the color resist aperture to increase a size of the opening of the color resist aperture; and wherein the opening of the color resist aperture is in a shape of a regular polygon, at least part of vertex angles of the regular polygon are rounded angles, and distances between the at least part of vertex angles of the regular polygon and the geometric center of the opening are equal;

wherein the size of the opening of the color resist aperture of the second filter unit is less than the size of the opening of the color resist aperture of the third filter unit, and wherein a ratio of the size of the opening of the color resist aperture of the first filter unit to the size of the opening of the color resist aperture of the second filter unit to the size of the opening of the color resist aperture of the third filter unit is 43:55:63, or, wherein the size of the opening of the color resist aperture of the first filter unit is not less than 365.5 μm and not greater than 494.5 μm, the size of the opening of the color resist aperture of the second filter unit is not less than 467.5 μm and not greater than 632.5 μm, and the size of the opening of the color resist aperture of the third filter unit is not less than 535.5 μm and not greater than 724.5 μm.

8. A display device, comprising a power supply assembly and the display panel as defined in claim 7, wherein the power supply assembly is configured to supply power to a backlight assembly in the display panel.

\* \* \* \* \*